United States Patent [19]

Stadlmeier et al.

[11] Patent Number: 4,653,018

[45] Date of Patent: Mar. 24, 1987

[54] METHOD AND ARRANGEMENT FOR THE CONTROLLING OF THE OPERATING PROCESS IN DATA PROCESSING INSTALLATIONS WITH MICROPROGRAM CONTROL

[75] Inventors: Hans Stadlmeier, Munich; Waldemar Strutynski, Neuried, both of Fed. Rep. of Germany

[73] Assignee: Siemens Aktiengesellschaft, Berlin and Munich, Fed. Rep. of Germany

[21] Appl. No.: 600,215

[22] Filed: Apr. 16, 1984

Related U.S. Application Data

[63] Continuation of Ser. No. 304,797, Sep. 23, 1981, abandoned.

[30] Foreign Application Priority Data

Sep. 30, 1980 [DE] Fed. Rep. of Germany ....... 3036926

[51] Int. Cl.⁴ .......................... G06F 1/04; G06F 11/30
[52] U.S. Cl. .................................................. 364/900
[58] Field of Search ........ 364/200, 900, 200 MS File, 364/900 MS File

[56] References Cited

U.S. PATENT DOCUMENTS

| 3,548,178 | 12/1970 | Carnevale et al. | 364/200 |
|---|---|---|---|
| 3,593,297 | 7/1971 | Kadner | 364/200 |
| 3,651,475 | 3/1972 | Dunbar et al. | 364/200 |
| 3,656,123 | 4/1972 | Carnevale et al. | 364/200 |
| 3,764,992 | 10/1973 | Milne | 364/200 |
| 3,988,714 | 10/1976 | Bardotti | 364/200 |
| 4,045,661 | 8/1977 | Antoine et al. | 235/153 AC |
| 4,057,847 | 11/1977 | Lowell et al. | 364/200 |

FOREIGN PATENT DOCUMENTS

| 2324906 | 5/1973 | Fed. Rep. of Germany . |
| 2248451 | 4/1974 | Fed. Rep. of Germany . |
| 2737133 | 11/1978 | Fed. Rep. of Germany . |

OTHER PUBLICATIONS

"Mikroprogrammierung", *Klar/Wichmann*, Jun. 1975, vol. 8, No. 3, pp. 154–159.

*Primary Examiner*—Thomas M. Heckler
*Attorney, Agent, or Firm*—Hill, Van Santen, Steadman & Simpson

[57] ABSTRACT

A method and apparatus for controlling the operating flow in a data processing installation having a memory control and a micro-program control, controlled by a central clock pulse generator, incorporates a monitoring and test device for monitoring events which interrupt the normal flow and for stopping the normal operation of said clock pulse generator and for instituting a special test cycle controlled by said clock pulse generator and for controlling the operating flow following said special test cycle in response to the results thereof.

16 Claims, 10 Drawing Figures

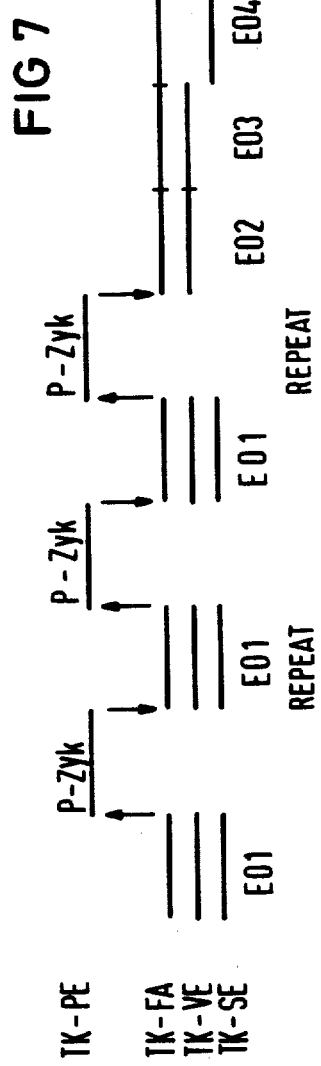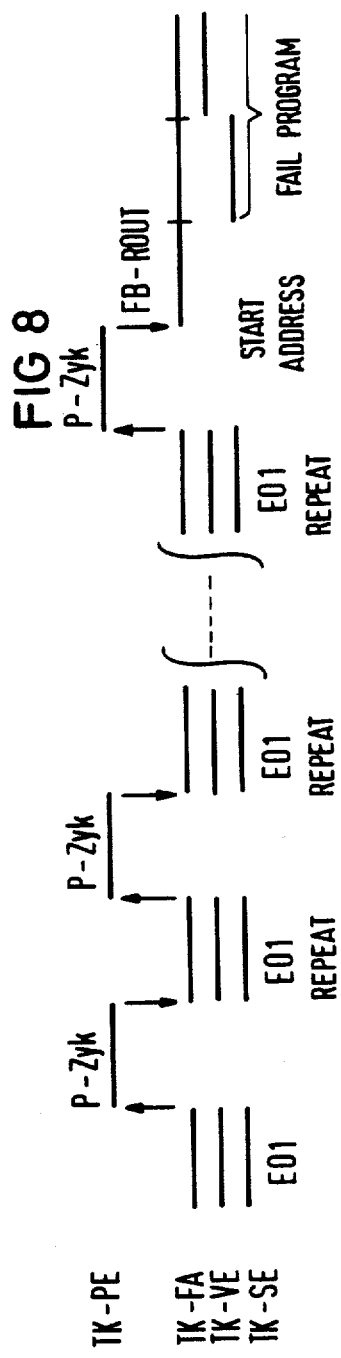

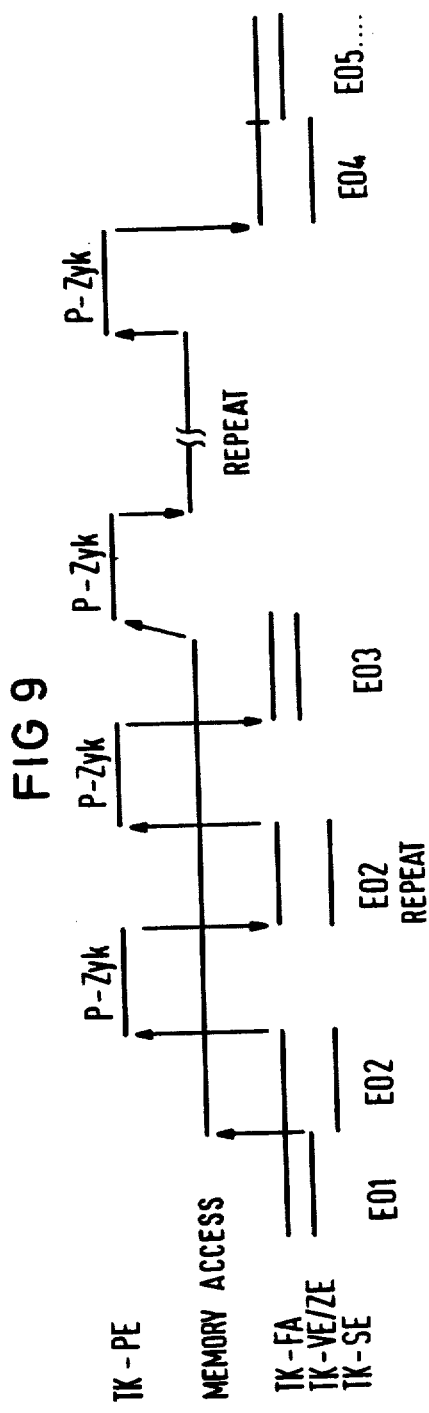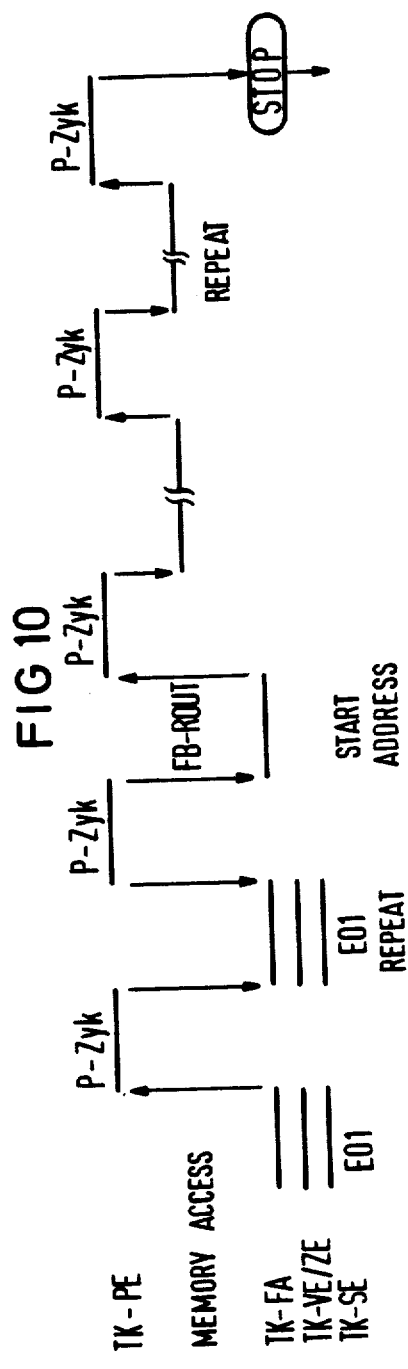

METHOD AND ARRANGEMENT FOR THE CONTROLLING OF THE OPERATING PROCESS IN DATA PROCESSING INSTALLATIONS WITH MICROPROGRAM CONTROL

This application is a continuation of application Ser. No. 304,797, filed Sep. 23, 1981, abandoned.

BACKGROUND OF THE INVENTION

1. Field of the Invention

The invention concerns a method and an arrangement for the controlling of the process flow in data processing installations with memory control and microprogram control which is dependent upon a central clock pulse generator whose clock pulses continuously form operating cycles for the execution of elementary operations of the microprogram control within the framework of the normal operating cycle and which can be stopped in the case of the occurrence of an event which interrupts the normal flow, such as an error, by means of a monitoring device in connection with a test device at the end of the operating cycle in progress in each case.

2. Prior Art

Due to the very complex structure of modern data processing installations, the occurrence of errors can never be excluded. In order to attain error-free results, it is necessary to make arrangements so that errors which occur can be detected and corrected. As a result, after determination of an error, the program in progress must first be interrupted.

In the German AS No. 2,248,451, an arrangement for monitoring for the presence of an error and the stopping of the generator which provides the operating clock pulses is provided. With a test clock pulse inserted at the end of the machine cycle, all monitoring points of the installation are interrogated and when an error is detected, the clock pulse generator is stopped during a time in which all data are still present in the registers for the operation which has just been carried out. The stopping of the installation with the last clock pulse in the machine cycle also has the advantage that after replacement of the erroneous data in the registers, a simple restarting is possible.

According to the German AS No. 2,324,906, in the case of the identification of an error, the installation is set back into a former state, and following this the flow of control steps bringing about the error is repeated with reduced clock pulse frequency more slowly and where applicable without error. As explained in the Germany Pat. No. 2,737,133 (column 3, line 68 through column 4, line 8), however, in the case of microprogram control units, the problem of the spreading of the effects of errors is not prevented particularly when the cause of the error extends over several elementary operations.

In the arrangement described in the German Pat. No. 2,737,133, there is coupled with the error register (which operates as monitoring device) an analysis network, which, via a pause generator, stops the clock pulse generator in each case before the clock pulse of the operating cycle introducing a new elementary operation and an error treatment routine is prepared. Then, after the passage of the pause time preset by means of the pause generator, the routine is started with release of the pulse. This known arrangement thus only reacts to errors which require a transfer into an error treatment routine.

In the case of modern installations, interruptions of the normal flow can be necessary not only due to errors of various kinds, such as hardware errors or program access errors, but also can be necessary due to further events, such as stopping or resetting of the installation, and the results of address comparisons with different reactions. It is necessary that the installation in the case of each interruption of the normal flow always assumes an unambiguous and reproducible state which permits a return into the normal operating flow without difficulty and excludes critical time conditions. Also, the parallel operation of independent functional units of the installation should thereby not be unnecessarily hindered.

SUMMARY OF THE INVENTION

The present invention solves this problem in that the monitoring device monitors all events which interrupt the normal flow, and upon the occurrence of such an event, the clock pulse generator is switched over from the operating cycle to a special test cycle, which interrupts the normal flow. The clock pulses of the test cycle control the test device coupled with the monitoring device. The test device, during the test cycle and in dependence upon the event causing the interruption of the normal flow, (for example, errors or attainment of a present state), decides which measure is to be introduced next. For example, the next step may be a return to the normal flow with repetition of the last elementary operation; an introduction of an error treatment routine; stopping of the installation; and/or requesting of special maintenance measures, such as by means of a service processor.

According to the invention therefore, all events which require an interruption of the normal flow are included in the monitoring, and a strict separation is observed between normal operating cycles during which the decisions are made concerning further operation. By means of the differentiation between operating cycles and test cycles in the case of stopping of the microprogram control, time-critical relationships are eliminated to a great extent and the microprogram control is unburdened. Accordingly, complex combinations of events can be identified and treated. Since the normal flow is not changed by means of the test device, the test device is easily accommodated to the most varied boundary conditions and system conditions. On the other hand, the normal flow is not delayed by means of the presence of the test device since a test cycle is introduced only in the case of events which cost time anyway.

In one embodiment of the present invention, the clock pulse supply has at least two separate clock pulse chains, for the derivation of clock pulses which form an operating cycle and a test cycle, a clock pulse chain changeover unit, and devices for the blocking of the result clock pulse phases for the operation cycle and for the generaton of a test clock pulse for the test device. The test device consists of a series of logic elements for the generation of a blocking signal for the result clock pulse phases and the changeover signal for the introduction of a test cycle, in dependence upon the present interruption requests and the test clock pulse of the clock pulse supply. The test device consists of a multiplicity of memory elements which indicate the individual interruption requests and serve as markers for the control system flow, and two counters for the identification of the number of repetitions as well as a logic circuit which, in dependence upon the information contents of the memory elements and the counters, in connection with the clock pulses of the test cycle, determine the continuation of the operating flow.

In order to also be able to execute a test cycle directly after restarting of the clock pulse generator, the clock pulse generator according to a further development of the invention has devices for the derivation of a further test signal for the monitoring device in the case of restarting of the clock pulse generator after a generator stop.

BRIEF DESCRIPTION OF THE DRAWINGS

Further details of the invention will be explained more precisely in the following with the use of an embodiment example depicted in the drawing, in which:

FIG. 7 through FIG. 10 show flow charts for the cycle sequence in the case of different interruption requests occurring one after the other individually or several simultaneously.

DESCRIPTION OF THE PREFERRED EMBODIMENTS

Figure 1:
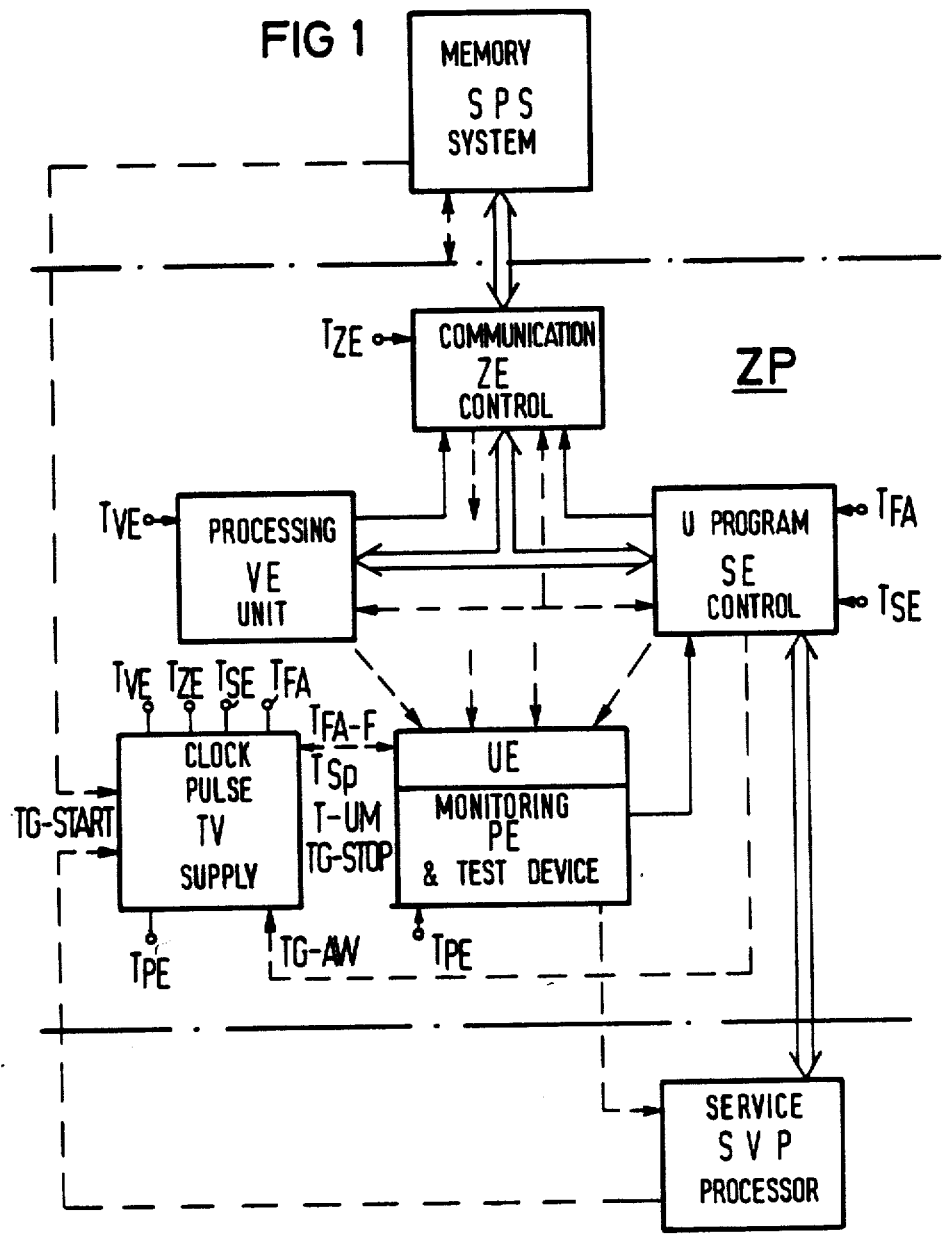
FIG. 1 shows a functional block diagram of a portion of a data processing device.

FIG. 1 shows a data processing device having a memory system SPS, a central processor ZP and a service procesor SVP for maintenance tasks. The central processor ZP is subdivided into several partial units SE, VE and ZE with a common microprogram control for the central processor ZP, so that tasks can be carried out partially parallel to one another. The partial unit VE represents the actual processing unit of the central processor which undertakes the linkage of the operands and in a known manner carries out arithmetic, logical, shifting and transfer functions.

The partial unit ZE has the task of controlling the traffic between the memory system SPS and the central processor ZP, and of supplying the processing unit VE with data and the control unit SE with microcommands. When virtual addresses are used, it also carries out the address translation into real addresses.

The partial unit SE controls the total microprogram flow in the central procesor ZP and the interfaces with the service processor SVP and, where applicable, with other processors such as input-output processors. Also, this unit can execute its own functions in parallel with those of the processing unit VE and the access unit ZE, such as for example, skip, setting and counting functions, prepare immediate operands, etc. This unit encompasses a reloadable elementary operation microcommand memory and a microcommand register for the other partial units VE and ZE and devices used in the sequence link computation.

Similar operating data processing devices with parallelly operating partial devices are described in German Pat. No. 2,704,560 and are embodied in commercially available model 7.541 of the Siemens System 7.500, and model 7.760 of the Siemens System 7.700.

For the coordination and controlling of the operating flow of the central processor ZP, in a known manner, a clock pulse supply TV is provided which supplies the partial units periodically with operating clock pulses. Also, as described, in the model of the German Pat. No. 2,737,133, a monitoring device UE is provided for the determination of interruption events and a test device PE is provided which according to the invention closely cooperates with the clock pulse suppy TV and assumes control in the case of the interruption of the normal operating flow of the central processor ZP.

Figure 2:
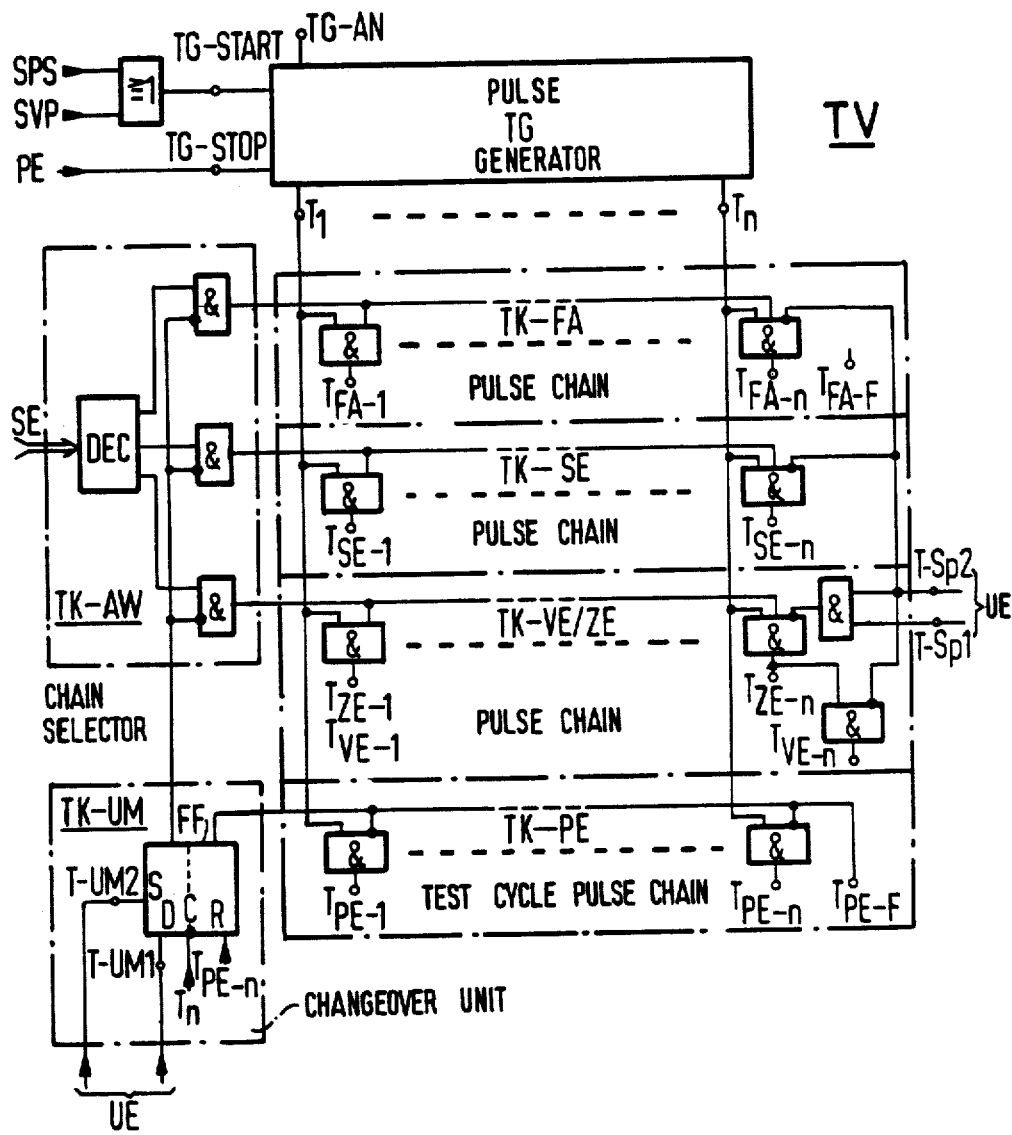
FIG. 2 shows a functional block diagram of the clock pulse supply TV of FIG. 1.

The clock pulse supply TV shown in FIG. 2 is divided into the clock pulse generator TG which provides cyclically consecutive clock pulses $T_1$ through $T_n$ for the following clock pulse chains TK . . . for the supplying of the individual partial units SE, VE and ZE of the central processor ZP in FIG. 1. The selection of the individual clock pulse chains required takes place by means of the device TK-AW in connection with the clock pulse chain changeover TK-UM.

The starting of the clock pulse generator takes place via the input TG-START by means of the service processor SVP or by means of the memory system SPS after a completed memory access, if the installation was previously in the stop state, in each case with the first clock pulse $T_1$. On the other hand, the clock pulse generator TG normally is stopped by means of the test device PE of the central processor ZP via the input TG-STOP and specifically in each case at the end of a clock pulse cycle, after release of the clock pulse $T_n$. None of the clock pulses or clock pulse phases $T_1$ through $T_n$ is then effective.

In total, there are three basic clock pulse chains for the individual processor partial units VE, ZE and SE as well as two basic clock pulse chains for the cycle types FA and PE provided, which control the sequence link computation in the control unit SE or, respectively, control the reaction by means of the test device PE. These five basic clock pulse chains are combined into four clock pulse chains TK-PE, TK-FA, TK-SE and TK-VE/ZE, which in part can proceed parallel to one another. For the active connection of the specific clock pulse chain required in each case, the device TK-UM first makes a preselection between the clock pulse chain TK-PE and all remaining clock pulse chains. This device consists of a conventional D-flip-flop FF, which is driven with the trailing edge of the last clock pulse $T_n$ of the clock pulse generator TG. The last clock pulse $T_{PE-n}$ of the clock pulse chain TK-PE acts upon the resetting input R of this flip-flop FF so that after each test cycle, switchover occurs again to an operating cycle while the switchover from the operation cycle to the test cycle in each case is brought about by means of a signal T-UMI from the monitoring and test device UE/PE to the input D. Independently of this, the flip-flop FF can be set statically via the setting input S with the signal T-UM2 from the monitoring device UE and thus be switched over to a test cycle when the clock pulse generator TG is again started after a generator stop which is brought about means of the signal TG-AN, so that even after a restarting of the clock pulse generator TG, first a test cycle can proceed. The further chain selection depends, for example, upon invalid bits of the associated micro-commands in the control device SE. These are converted or decoded in a manner known per se by a logic arrangement DEC into control signals for the AND elements which are connected to the selectable clock pulse chains.

As was mentioned above, the clock pulse chain TK-PE supplies the test device PE during a test cycle which, as needed, is inserted into the normal operating flow of the central processor. This chain and test cycle thus never run in parallel with the other clock pulse chains shown for the central processor ZP. However, the test cycle can proceed in parallel with an access to the memory system SPS.

The clock pulse chain TK-FA for the sequence link computation in the control device SE normally runs in parallel with the clock pulse chain TK-VE and/or TK-SE in order to be able to prepare the next microcommand; however, it runs alone when entry points for an address translation or an error treatment routine are to be calculated, or when not all commands are available, in the case of commands which can be carried out in parallel with the unit VE or ZE.

The clock pulse chain TK-VE/ZE is provided in common for the partial units VE and ZE of the central processor ZP. However, a difference exists between them with respect to the specific last clock pulses $T_{ZE-n}$ and $T_{VE-n}$. In the case of a general blocking of the last cycle clock pulses, the clock pulse $T_{ZE-n}$ is not blocked.

The necessity for a blocking of the last clock pulses of the clock pulse chain TK-FA and the clock pulse chains for the processor partial units SE, VE and ZE results from the following fact: with these clock pulses, in each case the input values are changed for the elementary operation to be carried out. However, if in the event of error an elementary operation is to be repeated, then the input values must not be changed, in order to avoid additional measures for a resetting into the initial state at the beginning of a operating cycle as, for example, in the case of the arrangement described in German AS No. 2,324,906. The same applies for the cyclical operation of the central processor ZP, for example, for the waiting state with cyclical repetition of one and the same elementary operation. In this case, however, the clock pulse $T_{ZE-n}$ is not blocked, in order to make possible an access to the memory system SPS.

In the arrangement of FIG. 2, the clock pulse blocking is accomplished by means of the two signals T-Sp1 and T-Sp2 of the monitoring device UE. When both signals are present, all last cycle clock pulses, that is, $T_{FA-n}$, $T_{SE-n}$, $T_{VE-n}$, and $T_{ZE-n}$ are blocked, while with the signal T-Sp2 alone, all these clock pulses with the exception of the clock pulse $T_{ZE-n}$ are blocked.

With special clock pulses derived from the clock pulse chain TK-FA, a clock pulse window $T_{FA-F}$ is derived, which covers the clock pulses $T_{FA-n-1}$ and $T_{FA-n}$, during each operating cycle. Also, the monitoring device UE in FIG. 1 is activated at this time in order to check whether an event has occurred which interrupts the normal flow of the central processor ZP and as a result of this whether switching is to occur to a test cycle for the test device PE. In other respects, the clock pulse supply TV on the model of the German AS No. 2,619,445 or German OS No. 2,907,170.

Figure 3:
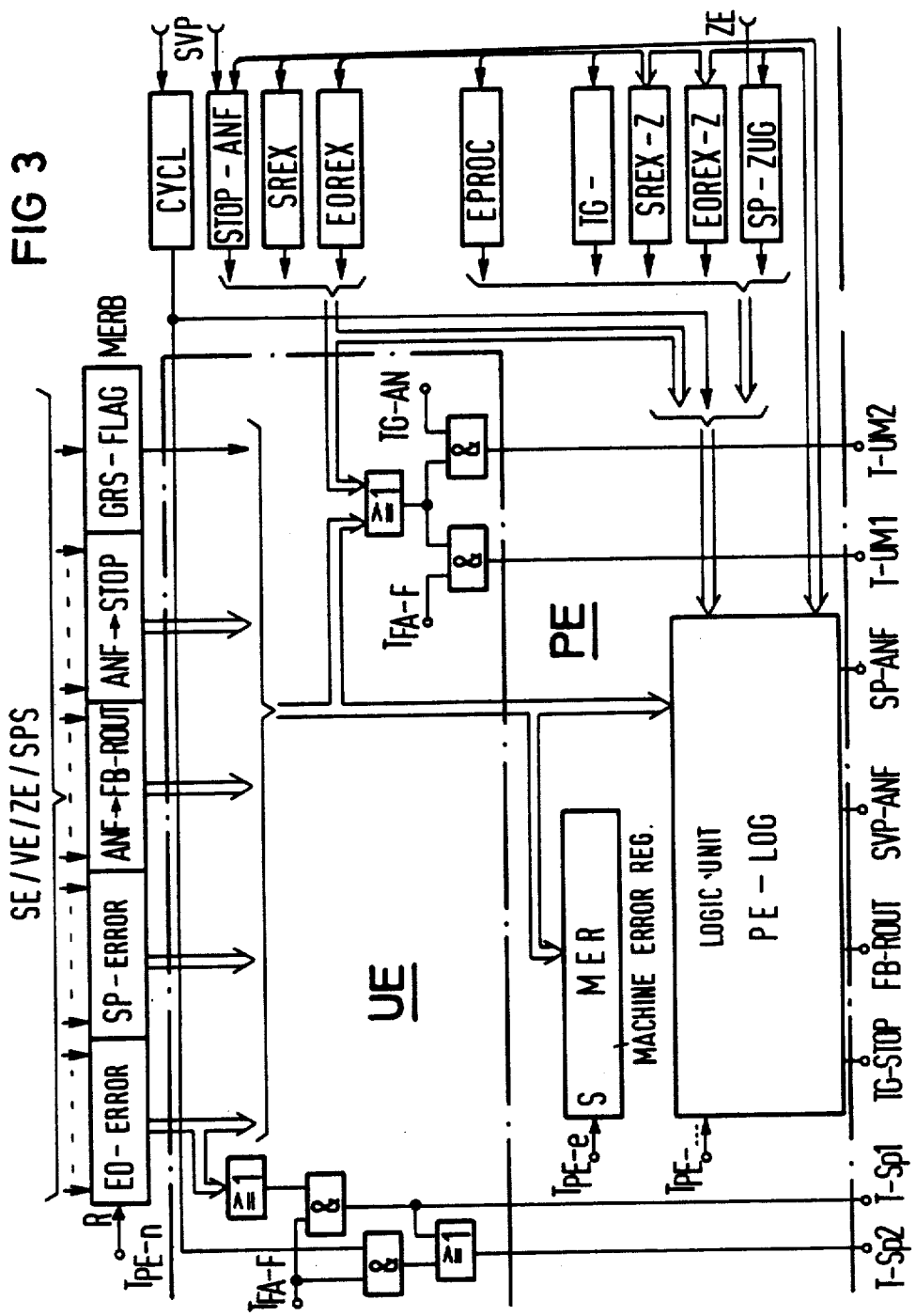
FIG. 3 shows a functional block diagram of the monitoring and test device UE/PE of FIG. 1.

The monitoring and test device UE/PE shown in FIG. 3 consists essentially of a buffer register MERB connected to the actual machine error register MER. Several markers such as CYCL, STOP-ANF, SREX, EOREX, EPROC, TG-HALT and SP-ZUG, in the form of flip-=flops which can be, if desired, incorporated into other registers are provided, as well as two counters SREX-Z and EOREX-Z, and a logic unit PE-LOG, as well as several elements for the monitoring device UE.

In the customary manner, like a machine error register, the buffer register MERB collects all error events and interruption requests which occur during the execution of an elementary operation (EO).

Differentiation is made between different groups of error and interruption requests:

(a) EO-Errors encompass, among other things, parity errors in the processing unit VE, in the access unit ZE, in the command buffer, in the microcommand- or microcommand address registers or in the address memory; parameter errors in the processing unit; result comparison errors in the processing unit VE or in the case of the microcommand sequence linkage etc.

(b) SP-Errors (memory errors) encompass, for example, parity errors in the address translation memory or hit errors in the case of the address translation; errors in the writing or reading in the operating memory of the memory system SPM; parity errors of the reading data, time errors in the case of the working storage traffic; parity errors in the control memory of the control device SE, etc.

(c) FB-ROUT Requests result, for example, through protection infringements in the case of virtual memory access, by means of address boundary crossing, by means of key errors by means of address comparisons of memory addresses, multipurpose register addresses or microcommand addresses.

(d) STOP Requests result by means of an address comparison when instead of the opposition in the error treatment routine, as a reaction mode, the stop state is required.

(e) GRS-FLAG is a bit which is set during resetting of the machine.

In an advantageous manner, this differentiation makes possible together with several of the markers named a reaction which is graded according to priorities.

The buffer register MERB and the markers STOP-ANF, SREX and EOREX are checked continuously by the monitoring device UE. For this test, two points in time are basic. One occurs toward the end of each EO cycle with a clock pulse window $T_{FA-F}$ which is formed from clock pulses, for example, $T_{FA-(n-1)}$ and $T_{FA-n}$ of the clock pulse chain TK-FA for the controlling of the sequence links. The other occurs when the clock pulse generator TG of the clock pulse supply TV is again started after a generator stop. As soon as any bit is set at these preset points in time in the buffer register MERB or in the three named markers, a changeover signal is formed for the changeover to a test cycle for the test device PE. Specifically, the signal T-UM1 is produced, in dependence upon the clock pulse window $T_{FA-F}$ and the signal T-UM2 in the case of the starting of the clock pulse generator TG in connection with the signal TG-AN. In this manner it is assured that after each clock pulse generator start, a test cycle is first inserted, so it can be recognized whether in the meantime, new errors or interruption requests have occurred. Also, the markers SREX and EOREX, which are set in the case of an automatic repetition of an erroneously executed memory access or an elementary operation, assure that after each repetition, a test cycle is first inserted in order to be able to check whether the repetition was successful and whether further interruption requests are present.

The monitoring device UE simultaneously carries out two further tests. In order to assure that in the case of erroneous execution of an elementary operation, the input values for the elementary operation are not changed, so that the elementary operation can be directly repeated, in the case of an EO error, the result clock pulses (and the clock pulses for the changing of the input values for an elementary operation to be carried out) are blocked. In the present case, these are the last clock pulse phases n of the clock pulse chains TK-FA, TK-SE, TK-VE/ZE. This test must also be carried out correspondingly early, which thus also expains the beginning of the clock pulse window $T_{FA-F}$, for example, with the clock pulse phase $(n-1)$.

The same applies for the cyclic operation, that is for a continuous repetition of an elementary operation, when the marker CYCL is set which thus also is checked by means of the monitoring device UE. In any case, the clock pulse $T_{ZE-n}$ of the clock pulse chain TK-VE/ZE is not blocked in order to make possible the initiation of an access to the memory system SPS. All these checks can take place in a manner know per se by means of AND elements which are gated by the window clock pulse $T_{FA-F}$ and to which where applicable OR elements are connected for the bundling of the signal lines which are to be monitored.

Also the logic network PE-LOG of the test device PE is dependent upon the information content of the buffer register MERB. Thus, both the changeover to a test cycle and the operating of the test device PE are controlled by the buffer register MERB while in the machine error register MER, errors and interruption requests are collected without obstructing the changeover controlled by the buffer register MERB. For this purpose, bits set in the buffer register MERB for new interruption requests are taken over in each case at the beginning of a test cycle into the machine error register MER and the buffer register MERB is reset at the end of the test cycle.

For the operating of the test device PE, the indicated markers and counters are also required. In connection with the two markers SREX and EOREX, which are set in the case of automatic repetition due to an erroneous memory access or an EO execution, the counters SREX-Z and EOREX-Z monitor the number of the repetitions so that after passage of a present number of repetitions, transfer can occur into the error treatment routine FB-ROUT. The marker EPROC characterizes the state of the error treatment and serves for the protection against double errors, while the marker TG-HALT in the set state at the end of a test cycle leads to the generator stop. The marker SP-ZUG is set when a memory access is started. All markers shown are monitorable by means of the logic network PE-LOG and except for the marker CYCL, can be set and reset by the logic network. Furthermore, the markers CYCL and STOP-ANF can be driven by the service processor SVP and the marker SP-ZUG can be driven by the access unit ZE.

Figure 4:
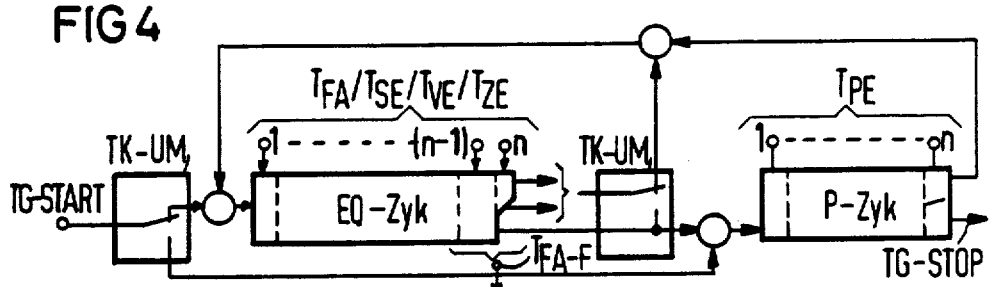
FIG. 4 shows the schematic illustration of the basic principal of the invention.

With the use of FIG. 4, the schematic flow of the total arrangement according to FIG. 1 can be understood. For this, an operating cycle EO-Zyk for an elementary operation and a test cycle P-Zyk are shown in the form of time slices with the clock pulse phases 1 through n of the chains controlling the flow. The operating cycle is normally started when the clock pulse generator TG is released, that is with the signal TG-START and at the end of the operating cycle, in the case of undisturbed flow, in each case a new operating cycle is begun. During the two last clock pulse phases $(n-1)$ and n of each operating cycle, with the clock pulse window $T_{FA-F}$, the monitoring device UE is activated, which checks whether in the meantime an error or an interruption request has occurred or in some other respect a reaction is necessary. In the case of set marker CYCL in FIG. 3, the reaction consists of blocking the clock pulse phase n for all chains with the exception of a clock pulse chain TK-ZE via signal T-Sp2. In the cases of an EO error, the clock pulse phase n of all clock pulse chains is to be blocked via signal T-Sp1/2, and switchover is to occur to a test cycle - signal T-UM1. This is indicated in FIG. 4 by means of the time slice constructed only partially for the clock pulse phase n of the cycle EO-Zyk. The changeover switch of the clock pulse chain changeover TK-UM is indicated in FIG. 4 which switches the clock pulse chain TK-PE which controls the test cycle to be operative. At the end of the test cycle P-Zyk then either switchover occurs back to an operating cycle EO-Zyk or the clock pulse generator TG is stopped, which is indicated with the signal TG-STOP.

So that an operating cycle is not introduced after each generator stop immediately in the case of the restarting of the clock pulse generator TG, but rather, where applicable, a test cycle can be preconnected, the start signal TG-START is also directed via a changeover switch of the clock pulse chain changeover TK-UM. The changeover to a preconnected test cycle P-Zyk in this case takes place by means of the signal T-UM2 of the monitoring device UE which independently of the clock pulse $T_{FA-F}$ undertakes a test even in the case of the presence of the signal TG-AN.

Figure 5:
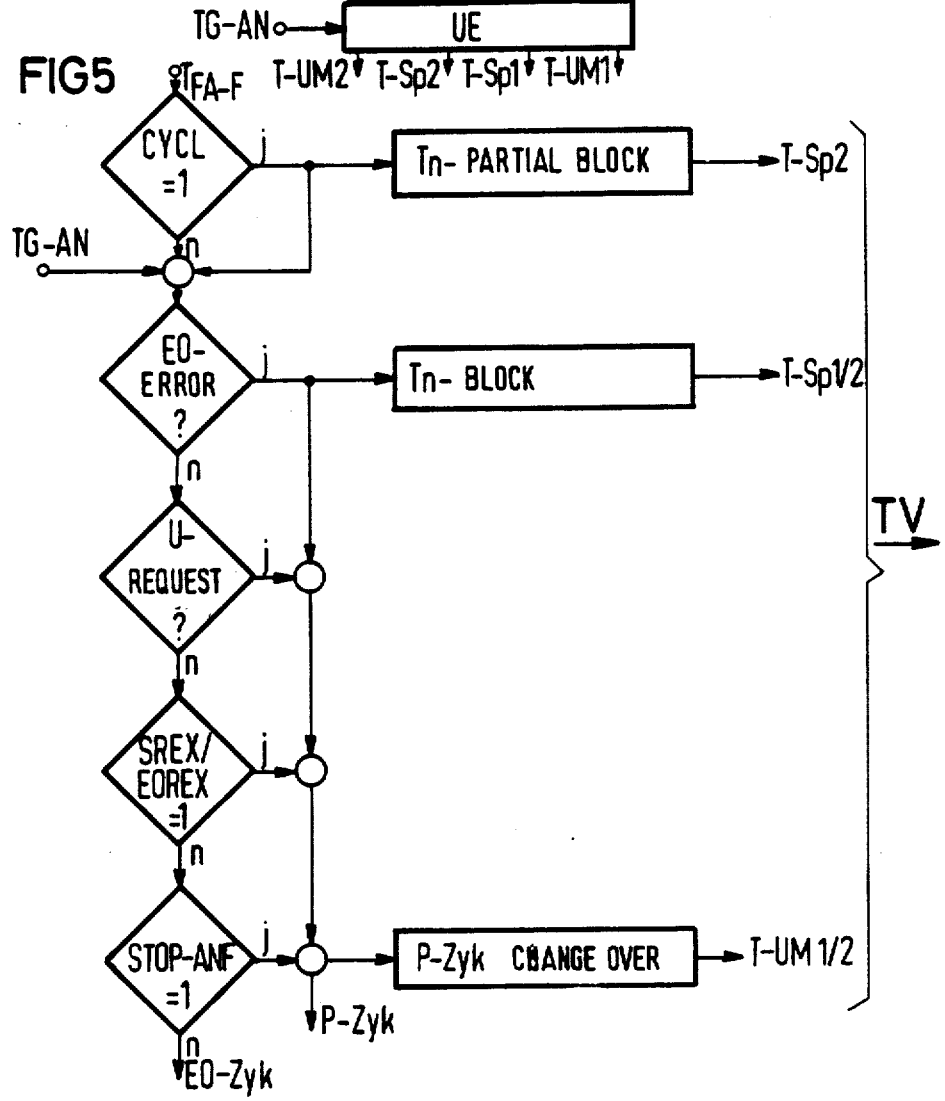
FIG. 5 shows a flow diagram for the decision logic of the monitoring device of FIG. 2.

The test logic of the monitoring device UE is shown in FIG. 5. In total, five status categories are to be monitored which is indicated in the left portion of the figure by means of the five decision diamonds:

(a) Is the marker CYCL set for cyclic repetition of the elementary operation in progress? If so, the partial blockage of the clock pulse phases n is to be carried out, which is controlled via the signal T-Sp2.

(b) Is there an EO error? If so, the elementary operation in progress must be repeated. For this, the present input values of the elementary operations in progress may not be changed by means of the result clock pulses. The clock pulse phase n is thus to be blocked for all clock pulse chains, which is controlled via the signal T-Sp1/2. Additionally, switch-over to a test-cycle must occur, which produces a signal T-UM1.

(c) Is there any other interruption request?

(d) Are the markers SREX and EOREX set because one is concerned with a reptition of the elementary operation or a memory access?

(e) Is there a stop request present and is the marker STOP-ANF set as a result of this?

In the three last named decision cases, there only occurs a changeover to the test cycle with the signal T-UM1 or, respectively T-UM2.

This decision logic of the monitoring device EU can be realized in a customary manner with AND and OR elements, as shown in FIG. 3.

Figure 6:
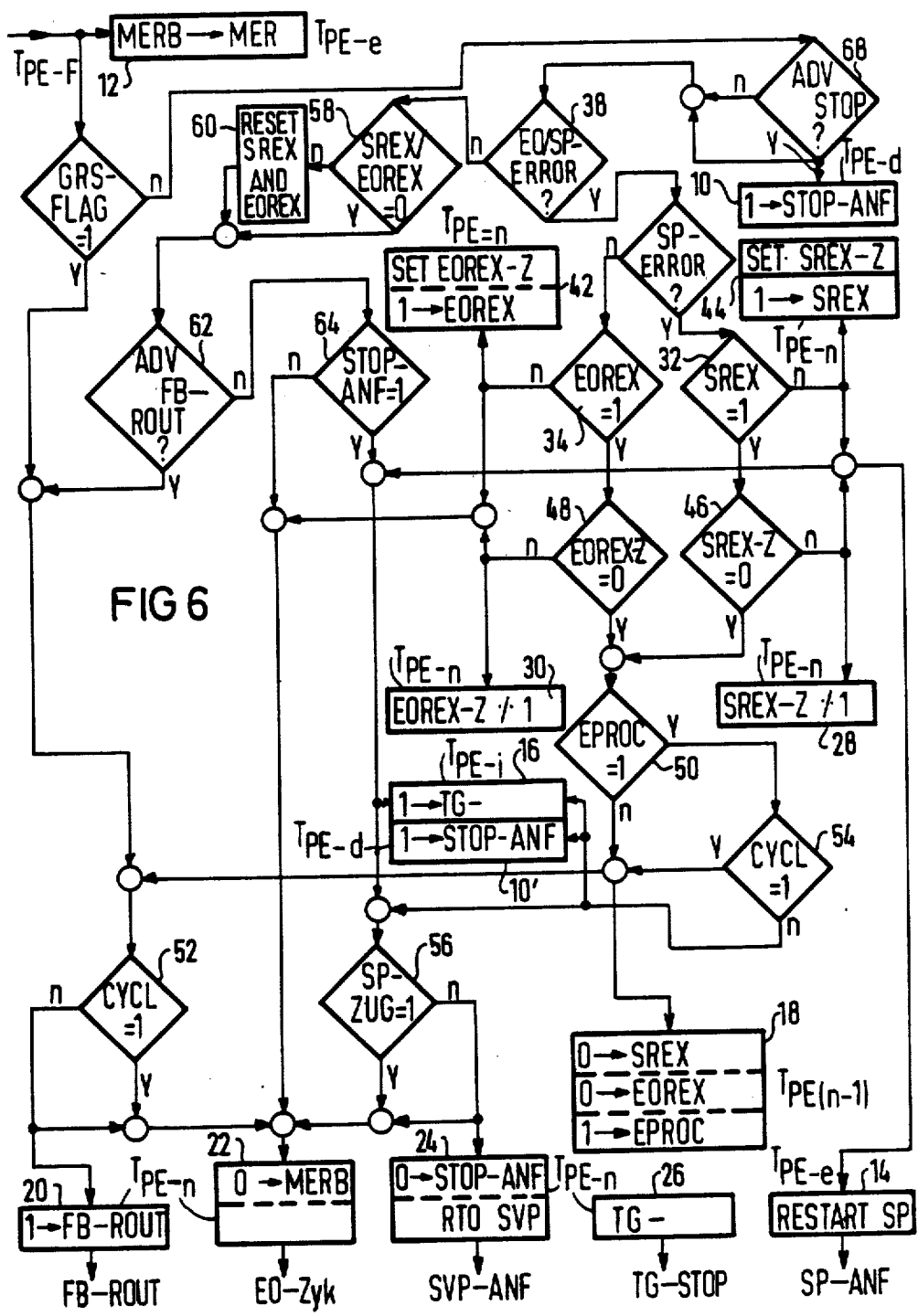
FIG. 6 shows a flow diagram for the decision logic of the logic network of the monitoring device of FIG. 3.

FIG. 6 shows, also in the form of a flow diagram, the decision logic for the logic network PE-LOG of the test device PE during a test cycle. The testing of all decision diamonds takes place with a static signal $T_{PE-F}$, which as FIG. 2 shows is like the selection signal for the clock pulse chain TK-PE. Embedded in this signal are the individual clock pulse phases of the clock pulse chain TK-PE which bring about the individual reactions identified by framing boxes. In the flow diagram according to FIG. 6, only the clock pulse phases of the test cycle indicated near the boxes are decisive, while the form of representation was chosen more for reasons of the overview. Each of the boxes in FIG. 6, as well as those in FIG. 5, is indicative of a functional unit. Such a unit may be embodied as a step in the program of programmable data processing apparatus, or, alternatively, may be embodied as physical structure such as comparators, registers, or the like.

Arranged according to reaction times, as the first, with the clock pulse phase d, the marker STOP-ANF is set by unit 10, and as a second, there follows with the phase e the transfer from the buffer register MERB into the machine error register MER via unit 12 and with the signal SP-ANF by unit 14, the repetition of a memory access.

With the clock pulse phase i, the marker TG-HALT is set by unit 16 and with the clock pulse phase (n−1) the markers SREX and EOREX are erased, while the marker EPROC is set by unit 18. Only with the result clock pulse phase n, for the concluding of a test cycle, the remaining results of the test become active, namely, the transition into the error treatment routine FB-ROUT by unit 20, the changeover to the operating cycle with simultaneous resetting of the buffer register MERB by unit 22, the request SVP-ANF for the service processor SVP with simulataneous erasing of the stop request by unit 24 or the signal TG-STOP for the generator stop by unit 26, and the counts of the counters SREX-Z and EOREX-Z are changed by units 28 and 30, and the associated markers SREX or, respectively, EOREX are set by units 32 and 34.

The parcelling also of the test cycle into individual clock pulse phases thus guarantees a time-appropriate flow of the reactions during the test cycle.

Apart from the first test by unit 36, namely, whether the marker GRS-FLAG is set because the machine has been reset and as a result of this, first an entry into the error treatment routine is necessary, via unit 20, before transfer can occur into the normal operating flow, the highest priority is given to the memory errors because for a memory access, in comparison to the duration of an operating cycle, significantly more time is necessary and a delay brings with it unnecessary delay time. The next lower priority is associated to an EO error since a continuation of the normal flow is only practical when an elementary operation has been carried out regularly and without error.

Thus, unit 38 first checks whether a memory or EO error is present. If this is the case, unit 40 checks whether it is a memory error. In both cases there then takes place a checking, via units 32 or 34 of the associated markers SREX or EOREX with the result that either the associated marker and the associated counter SREX-Z or EOREX-Z is set by units 46 or 48 in order to be able to monitor the number of the repetitions, or the associated counter SREX-Z or EOREX-Z is monitored by units 46 or 48 as to whether the number of allowable repetitions has been exceeded. If a further repetition is allowable, units 28 or 30 decrease the count of the counter by one and the repetition is introduced by unit 14 with the reaction RESTART-SP and a corresponding request SP-ANF to the memory or, respectively, by units 22 with a switch-back to the operating cycle at the end of the test cycle.

If a repetition is no longer possible, unit 50 checks whether one is concerned with an error during an error treatment procedure and thus with a double error. If the marker EPROC is not set and thus there is no double error, then the markers SREX and EOREX are erased and the marker EPROC is set by unit 18. Besides this, an error treatment routine is introduced, with signal FB-ROUT at the end of the test cycle by unit 20, in a known manner. Prerequisite for this is, however, that the machine is not in the cyclically operating state, thus the marker CYCL is not set. This marker is inspected by the unit 52. Switchover occurs to the next operating cycle.

For the case of a double error, when no cyclic operating state is given, as determined by unit 54, first the markers STOP-ANF and TG-HALT are set by units 10' and 16. If further, the marker SP-ZUG is not set as determined by unit 56, because at the time no memory access is taking place, then the marker STOP-ANF is again erased at the end of the test cycle and the service processor SVP is requested with the signal SVP-ANF by unit 24. If on the other hand the marker SP-ZUG is set, then the erasing of the stop request does not occur and the service processor is not requested. In both cases, however, because of the previously set marker TG-HALT, the clock pulse generator at the end of the test cycle is stopped by unit 26 with the signal TG-STOP until the clock pulse generator TG is started again by means of the service processor SVP or the memory system SPS (FIG. 2).

If neither a memory error nor an EO error is present, then unit 58 checks whether the markers SREX and EOREX have been erased. If these markers are set then they are erased by unit 60 since either a repetition has been completed successfully or it is appropriate after a restarting of the clock pulse generator to create a defined output state.

In conclusion it is checked by unit 62 whether an address comparison with opposition into the error treatment routine FBROUT is present as reaction mode or not. If so, the same reaction results as in the case of the set GRS-FLAG. In other cases, it is checked by unit 64, with the lowest priority, whether a stop request is present and thus the marker STOP-ANF is set by unit 24. If a stop request is present, the marker TG-HALT is set by unit 16, and dependently, in the case of the presence of a memory access, as was already explained, the clock pulse generator is stopped with or without simultaneous request for the service processor SVP.

During a memory access, therefore, further elementary operations can be worked off and in the event of error, can also be repeated unless data are required which must first be made available by means of the memory access. However as soon as a memory error occurs, the parallel operation is ended in order to avoid insurmountable difficulties which may occur in the case of the error treatment. Memory access repetitions thus proceed alone and the processing of elementary operations is resumed only after successful memory access. To this purpose, a setting of the marker TG-HALT by unit 16, as in the case of the presence of a stop request is connected with the repetition request for the memory.

There still remains the address comparison with stop reaction which has the same priority as a stop request. If however, the test for this in the case of the embodiment illustrated in FIG. 6 is provided by unit 66 before the testing for the presence of a memory or EO error, then thereby the timely setting of the marker STOP-ANF is secured by unit 10. In any case, the introduction of the stop state remains the last activity of the test device PE which comes into effect when all remaining requests have been worked off.

At the end of each test cycle, in every case switch back occurs to the operating cycles. However, whether this is introduced immediately or only later is dependent upon whether together with this the signal TG-STOP become effective or not.

The construction of the logic network PE-LOG can again be accomplished with customary AND and OR elements in a simple manner.

With the use of several examples shown in FIGS. 7-10, the flow of the individual cycles is to be indicated in the case of different interruption requests.

FIG. 7 shows the flow during the occurrence of an EO error during an operating cycle for the elementary operation EO1, whereby the clock pulse chains TK-FA, TK-VE and TK-SE run in parallel; that is, besides the execution of a sequence link computation for the next elementary operation EO2 to be carried out, the processing unit VE and the control unit SE operate in parallel. Due to the EO error which has occurred, at the end of the operating cycle for the elementary operation EO1, switchover occurs to a test cycle and the EO error is recognized as such. The result is a repetition of the elementary operation EO1 and the execution of a further test cycle. Since the error occurs again, a further repetition and a further test cycle takes place. Since after the further test cycle, no error is determined any longer, it can be concluded that the elementary operation EO1 has been successfully completed. Therefore, the operating cycle for the elementary operation EO2 is introduced and since this also is executed without error, the operating cycle for the elementary operation EO3 is introduced without a further interruption by a test cycle taking place. In the case of error-free operation of the machine, there thus takes place no interruption of the normal flow by a test cycle.

In the case of the flow diagram according to FIG. 8, proceeding from the example according to FIG. 7, the repetition of the error-encumbered elementary operation EO1 does not lead to its goal. In total, repetition occurs 16 times. Following this, the test cycle leads to the entry and to the error treatment routine with the result that first only the clock pulse chain TK-FA proceeds, in order to compute the start address for the errortreatment routine, with which the error program is started, and in the following operating cycles permits the control unit SE and the processing unit VE to become active.

FIG. 9 illustrates the memory access parallel to the execution of the elementary operations. During the operating cycle for the elementary operation EO1, the access unit ZE begins an access to the memory system. During this access, independently of it, waiting elementary operations are worked off. The operating cycle for the elementary operation EO2 does not proceed without error, so that a test cycle is inserted and the elementary operation EO2 is repeated. Since the repetition is successful, the following test cycle transfers to the operating cycle for the elementary operation EO3. During this operating cycle, a memory error is reported. The test cycle introduced thereby again starts the memory access and stops the processing of further elementary operations until the memory reports the successful ending of the access and the stopped clock pulse generator in FIG. 2 again starts. Due to the set marker SREX, with the starting of the generator, switchover occurs directly to a test cycle. Since the memory access repetition was however successful and no further interruption request is present, the normal operating flow is again continued with execution of the elementary operations EO4 and EO5, etc.

Finally, FIG. 10 illustrates the superposition of several interruption requests with different priority. Let it be assumed that during an operating cycle, the following errors occur:

(a) An EO error,
(b) An address comparison with opposition into the error treatment routine, and
(c) A stop request by means of the service processor SVP.

Furthermore, during the computation of the start address for the error treatment routine, a memory request occurs with following memory error.

After run-through of the first operating cycle with its three interruption requests, first test cycle is carried out.

Since the EO error has the highest priority of the present requests, as was already explained, the elementary operation is repeated first. The other requests are not lost thereby since the address comparison is connected to the elementary operation to be carried out and thus returns in the case of the repetition and since besides this, the marker STOP-ANF remains set. In the following test cycle, the repetition of the elementary operation is identified as successful, the address comparison with opposition into the error treatment routine appears again and can now be considered. In the following operating cycle for the computation of the entry point for the error treatment routine, a memory request occurs. Since the marker STOP-ANF is still set, there again occurs a switch over to a test cycle with the result that due to the memory access, first only the clock pulse generator is stopped while the request for the service processor SVP at first does not occur. An error occurring during the memory access in progress leads to a further test cycle with a repetition of the memory access which now proceeds successfully. The clock pulse generator after this is again started by the memory which due to the set marker SREX leads to a directly following further test cycle. Finally, the stop request of the service processor SVP comes into effect. The marker STOP-ANF is erased, the clock pulse generator is stopped again and the request for the service processor SVP becomes effective.

In total, the use of the new method according to the invention leads to a very efficient data processing device whereby the errors and interruption requests are determined already on the level of the elementary operations and are also treated in part. All decisions concerning the treatment of errors and interruption requests are combined in the special test device which is realizable in a simple manner and can be accommodated to the most varied boundary conditions and system conditions. The decision logic indicated in FIG. 6 thus represents only an illustrative embodiment example in order to make the principle manner of operation of the test device understandable. Thus, for example, further flow states can be considered easily or differentiation can occur in the case of memory access between accesses for data which require the processng device VE and for microcommands for loading the control memory of the control device SE. Other modifications and additions can be made by those skilled in the art, without departing from the essential features of novelty of the invention, which are intended to be defined and secured by the appended claims.

What is claimed is:

1. A method for controlling the operating flow in a data processing installation having a memory control and a micro-program control, controlled by a central clock pulse generator, the pulses of which continuously form operating cycles for the execution of an elementary operation (EO) of the micro-program control within the framework of the normal operating flow, which can be stopped by means of a monitoring device in connection with a test device at the end of the operating cycle in progress, said test device being located in the immediate vicinity of said data processing installation and being connected with said monitoring device for assuming program control imrediately in the event of interruption of the normal operating flow, or at the occurrence of an event which interrupts normal flow, comprising the steps of using said monitoring device to continuously monitor all possible events which can interrupt the normal flow, including events occuring during program control by said monitoring device, and upon the occurrence of such an event, immediately switching over the clock pulse generator from the operating cycle to a special test cycle out of the normal flow, and using the clock pulses of the clock pulse generator to control said test device, said test device being operative to determine, during said test cycle, in response to the events bringing about the interruption of the normal flow, which of plural measures is to be introduced following the test cycle, such plural measures including the normal flow with repetation of the last elementary operation, introduction of an error treatment routine, stopping of the installation, and/or initiating a request for special maintenance measures, such as for example, by means of a service processor.

2. The method according to claim 1, including the steps of intermediately storing, in a buffer register, an indication of events which interrupt the normal flow, checking the content of the buffer register together with predetermined parameters representative of detected events for the controlling of the test device at the end of each operating cycle, and transferring the contents stored in the buffer register at the beginning of an introduced test cycle into an error register, and erasing the buffer register at the end of the test cycle.

3. The method according to claim 2, wherein the monitoring for the presence of an interruption request during the operating cycle in progress takes place by means of a pulse formed by the last clock pulse of the operating cycle.

4. The method according to claim 1, wherein the monitoring for the presence of an interruption request takes place in the case of restarting of the clock pulse generator after a generator stop, and introducing a test cycle directly after the restarting of the clock pulse generator.

5. The method according to claim 1 wherein the test device in the case of several simultaneously occurring events, checks such events one at a time, and during a test cycle parameters representative of detected events are intermediately stored and are treated in following test cycles, whereby after each test cycle a first switchback occurs to an operating cycle for the micro-program control independently of whether the operating cycle is carried out directly afterward.

6. The method according to claim 1, including the steps of separating in the case of error, monitoring the number of conpleted repetitions and when a preset number of repetitions is exceeded without success, transferring into an error treatment routine, while in the case of successful repetition, the operation of the microprogram control system is continued.

7. The method according to claim 6 including the steps of detecting the occurrence of a new error during an error treatment routine, repeating said error treatment routine, and stopping said test device if said new error is repeated.

8. The method according to claim 6, including the steps of detecting erronous execution of an elementary operation, and disabling generation of the last clock pulse of the operating cycle in progress, so that the input values present at the start of the elementary operation remain preserved unchanged for repetitions of the elementary operation.

9. The method according to claim 6, when said normal operating flow includes a memory access, including the steps of continuing the execution of elementary operations of the micro-program control system, unless a memory error is detected, and stopping the execution of elementary operations until the repetition of the memory access had lead to error-free memory operation.

10. The method according to claim 1, wherein in the case of cyclic repetition of the same elementary operation, only a stop request leads to the interruption of the cyclic repetition.

11. The method according to claim 1 for a data processing installation having units controlled by a common micro-program control system, but otherwise independent and operating partially in parallel, and with separate clock pulse chains for the controlling of the operating flow of these units, including the steps of, during a test cycle blocking all remaining clock pulse chains with the exception of the clcok pulse chain for the test device, and in the case of an erroneous execution of an elementary operation blocking the result clock pulses of all clock pulse chains in progress during this operating cycle, in the case of cyclic repetition of the same elementary operation where error-free execution occurs, unblocking only the result clock pulses which permit memory accesses.

12. The method according to claim 1, including the step of resuming normal operating flow at the last clock pulse of the test cycle.

13. The method according to claim 1, when said normal operating flow includes a stop request, including the steps of setting a storage device, and entering the stop state only when all remaining events have been treated by the test device.

14. A method for controlling the operating flow in a data processing installation having a memory control and a micro-program control, controlled by a central clock pulse generator, the pulses of which continuously form operating cycles for the execution of an elementary operation (EO) of the micro-program control within the framework of the normal operating flow, which can be stopped by means of a monitoring device in connection with a test device at the end of the operating cycle in progress, said test device being connected with said monitoring device and for assuming program control in the event of interruption of the normal operating flow, or at the occurrence of an event which interrupts normal flow, comprising the steps of using said monitoring device to monitor all events which interrupt the normal flow and upon the occurrence of such an event, switching over the clock pulse generator from the operating cycle to a special test cycle which interrupts the normal flow, and using the clock pulses of the clock pulse generator to control said test device, said test device being operative to determine, during the test cycle, in response to the events bringing about the interruption of the normal flow, which measure is to be introduced following the test cycle, such measures including the normal flow with repetition of the last elementary operation, introduction of an error treatment routine, stopping of the installation, and/or initiating a request for special maintanenance measures, such as for example, by means of a service processor; and in the case of a repetition, setting a storage device, and after successful repetition making a renewed changeover, in response to the state of said storage device, to a test cycle for testing before the operation of the micro-program control system is continued.

15. Apparatus for controlling the operating flow in a data processing installation, having a memory control and a micro-program control controlled by a clock pulse supply, said clock pulse supply including a central clock pulse generator, said clock pulse generator having at least two separate clock pulse chains for use during an operating cylce and a test cycle, a clock pulse change over unit connected to said central clock pulse generator, said clock pulse supply including pulse blocking means for preventing said central clock pulse generator from generating a clock pulse which would result in modifying the result of an operating cycle, said apparatus including a monitoring device, said monitoring device being connected to said pulse blocking means and including means for the generation of a signal which blocks operations of said central clock pulse generator, said monitoring device being connected to said clock pulse change over means for controlling operation thereof for selecting one of said clock pulse chains to produce a series of test clock pulses comprising a test cycle, said monitoring device being connected and responsive to interruption requests and to the test clock pulses of said clock pulse generator, a test device incorporating a plurality of memory elements for manifesting individual interruption requests, means for repeating cycles of operations which cause interupt requests, counter means for counting repetitions of cycles of operations, and a logic network connected to said plurality of memory elements and to said counter means for producing an output signal responsive to the clock pulses of said test cycle.

16. Apparatus according to claim 15, wherein the clock pulse generator of the clock pulse supply include devices for the derivation of a further test signal for the monitoring device in the case of restarting the clock pulse generator after a generator stop.

* * * * *